United States Patent Office 3,475,378
Patented Oct. 28, 1969

3,475,378
PROCESS FOR THE PRODUCTION OF HIGH MOLECULAR WEIGHT POLYURETHANE ELASTOMERS BY THE MILLABLE GUM METHOD
Peter Fischer, Cologne-Flittard, and Wilhelm Kallert, Cologne-Stammhein, Germany, assignors to Farbenfabriken Bayer Aktiengesellschaft, Leverkusen, Germany, a corporation of Germany
No Drawing. Filed Aug. 15, 1966, Ser. No. 572,212
Claims priority, application Germany, Aug. 31, 1965, F 47,046
Int. Cl. C08g 17/00, 22/08, 22/10
U.S. Cl. 260—75                     4 Claims

ABSTRACT OF THE DISCLOSURE

Elastomeric polyurethane plastics are prepared by reacting a storage stable intermediate with the dimer of 2,4'-diisocyanatodiphenylmethane or the urea prepared by reacting this same diisocyanate with water, the intermediate having been prepared by reacting an organic compound having a molecular weight of at least 800 and a chain extending agent having active hydrogen atoms with an organic diisocyanate.

---

This invention relates to the preparation of high molecular weight polyurethane elastomers by the millable gum technique. More particularly, it relates to storage stable intermediates cured using a particular diisocyanate.

It is known that high molecular weight elastic synthetic resins can be prepared from linear or predominantly linear condensation products or polymerization products which carry terminal, active hydrogen atoms and have molecular weights of over 800, and diisocyanates in the presence of compounds with at least two hydrogen atoms capable of reaction with isocyanate groups and having molecular weights of below 800. In this case, polyesters, polyesteramides, polyethers, polythioethers or polyacetals containing hydroxyl groups, are mainly used as the condensation products and polymerization products with terminal, reactive hydrogen atoms and molecular weight of over 800. Included among the compounds with at least two hydrogen atoms capable of reacting with isocyanate groups and molecular weights of less than 800, are water, dihydric and trihydric alcohols, including those with urethane and ester groups, as well as amino alcohols and diamines. Aromatic diisocyanates such as, for example, 1,5-naphthylene diisocyanate, p-phenylene diisocyanate or diphenylmethane diisocyanate, are mainly used as the diisocyanates.

High molecular weight plastics with a variety of properties can be obtained in known manner by suitably selecting the components and the proportions in which they are used, and by the sequence in which the individual stages of the reaction are completed. Several of these processes concern in particular the production of elastomeric products, in which case one object is to obtain, as the intermediate stage, rollable sheets which, though of relatively high molecular weight even at this stage, are still soluble in organic solvents and, like natural rubber, can be processed on the machines commonly used in the rubber industry, into rubber-like elastic end products. In a preferred form of one such process, hydroxyl-group-containing polyesters, polyesteramides, polyethers, polythioethers or polyacetals are reacted in admixture or even successively with a chain-extender with a deficit, based on the total amount of hydroxyl groups present, of an aromatic diisocyanate, to form a rollable sheet to which another aromatic diisocyanate is added in an excess over and above the quantity, based on the number of hydroxyl groups still present in the rollable sheet, prior to ultimate processing and shaping on rubber mixing rolls. Depending on the second diisocyanate used, the intermediate sheet has to be molded or formed immediately into the elastomeric end product at elevated temperature or, alternatively, the intermediate sheet may be stored for a more or less prolonged period during which the ultimate reaction progresses very slowly in the cold.

In order to prolong the storage period, diisocyanates corresponding to the formula

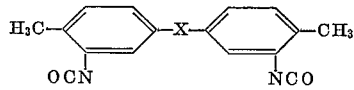

with

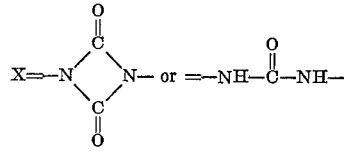

have been used in practice, mixtures of which produce a storage life varying from 1 to 3 days and, where the vulcanization times are short, yield satisfactory end products. Unfortunately, they are extremely difficult to use in heated finishing rooms and, when processed on extruders or calendars, the mixtures have a marked tendency towards premature incipient vulcanization.

Like the storage life of the intermediate stage, the resistance of the end product, i.e. the elastic polyurethane synthetic, to degradation under the effect of moisture and heat, is largely governed by the choice of a suitable polyisocyanate.

It is therefore an object of this invention to provide an improved process for preparing polyurethane elastomers. It is another object of this invention to provide polyurethane elastomers by the millable gum method, the reaction mixtures of which have a long storage time. It is another object of this invention to provide polyurethane plastics having improved resistance to degradation under the effect of moisture and heat.

The foregoing objects and others which will become apparent from the following description are accomplished in accordance with the invention generally speaking by providing an improved process for the production of high molecular weight elastic synthetic resins from a storage stable intermediate polyurethane composition, prepared from an organic compound having active hydrogen atoms which are reactive with NCO groups and a molecular weight of over 800, an organic diisocyanate and a chain-extending agent having at least two hydrogen atoms capable of reacting with isocyanate groups and molecular weights of less than 800 and a diisocyanate having the formula

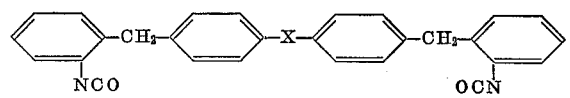

wherein X is

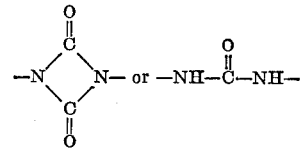

as the crosslinking diisocyanate.

Mixtures with considerably improved shelf lives and, at the same time, outstanding vulcanization behavior are obtained. In addition, the vulcanizates exhibit outstanding physical properties. Compared with the elastomers obtained by known processes, the products obtained in accordance with the invention exhibit far superior resistance to aging.

Derivatives of 2,4'-diisocyanatodiphenylmethane which are used in accordance with the invention are new. The dimer containing a uretdione group can be prepared as known per se, for example, by the action of a catalytically active quantity of trialkyl phosphine on 2,4'-diisocyanatodiphenylmethane. The compound melts at 199° C. The urea derivative of 2,4'-diisocyanatodiphenylmethane is formed by the action of water on monomeric diisocyanate in a molar ratio of 1:2. This compound melts at temperatures above 180° C. with decomposition. The 2,4'-diisocyanatodiphenylmethane required as the starting material, is formed by the reaction of aniline-formaldehyde condensates with phosgene, and can be isolated as a pure substance solidifying at 34.5° C. from the resulting polyisocyanate mixture by fractional distillation, if desired in combination with fractional crystallization.

In place of pure derivatives, it is even possible to use mixtures of the derivatives to be used in accordance with the invention, and even mixtures of the derivatives of 2,4'-diisocyanatodiphenylmethane with up to 15% by weight of the corresponding derivatives of 4,4'-diisocyanatodiphenylmethane. Starting materials of this type are formed by isolating mixtures of 2,4'- and 4,4'-diisocyanatodiphenylmethane in place of pure isomers, from the polyisocyanate mixture formed from amine and phosgene during the separation of diisocyanate, and by subsequently reacting them either with trialkyl phosphine or with water to form uretdione or urea derivatives. The preparation of mixtures such as these is more economical than the recovery of pure substances by virtue of the lower cost of distillation in the separation of the diisocyanates from a polyisocyanate mixture. It would even be possible to employ the diisocyanates used in accordance with the invention in admixture with ordinary organic polyisocyanates. The storable polyurethane composition is prepared as known by simultaneously reacting the components, or even by subsequent addition of the chain extender in which case steps must be taken to eliminate the free NCO groups present.

Any suitable organic compound containing active hydrogen atoms which are reactive with NCO groups such as, for example, hydroxyl polyesters, polyhydric polyalkylene ethers, polyhydric polythioethers, polyacetals and the like may be used.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxy-methyl-cyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, beta-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenylpropane-4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(beta-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

The quantity of functional groups containing reactive hydrogen atoms in the polymerization or condensation products with a molecular weight of more than 1000 is preferably in the range from 0.6 to 2.4%.

Any suitable chain extending agent containing active hydrogen atoms which are reactive with NCO groups and having a molecular weight less than about 800 may be used such as, for example, water, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(beta-hydroxy ethyl ether), 1,3-phenylene-bis-(beta-hydroxy ethyl ether), bis-(hydroxy methyl-cyclohexane), hexanediol, diethylene glycol, dipropylene glycol and the like; polyamines such as for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloroaniline), 3,3-dichloro-4,4'-biphenyl diamine, 2,6-diamino pyridine, 4,4'-diamino diphenylmethane and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omega-amino-caproic acid dihydrazide, gamma-hydroxy butyric hydrazide, bis-semicarbazide, bis-hydrazine carbonic esters of glycols such as many of the glycols heretofore mentioned and the like.

Suitable polyisocyanates for the preparation of the storage stable intermediate polyurethane composition include, for example, 4,4'-diisocyanatodiphenylmethane, optionally in admixture with 2,4'-diisocyanatodiphenylmethane and its substitution products such as 4,4'-diisocyanatodiphenyldimethylmethane, as well as 2,4- and 2,6-toluylene diisocyanate, m-phenylene diisocyanate, p-phenylene diisocyanate, 1,5-naphthylene diisocyanate, xylylene diisocyanate, cyclohexylene-1,4-diisocyanate, hexamethylene diisocyanate. To crosslink the storable polyurethane composition by the process according to the invention, the 2,4'-diisocyanatodiphenylmethane derivative described above is mixed with it, optionally together with fillers, plasticizers, anti-agers, pigments, expanding or blowing agents and accelerators, by the methods normally employed in the rubber industry.

Suitable additives include, for example, carbon black, active, semi-active or inactive light fillers of the type normally used in the rubber industry, as well as phthalic acid esters and adipic acid polyesters as plasticizers, bis-(2,6-diisopropylphenyl)-carbodiimide or a polycarbodiimide prepared from 2,4-diisocyanato-1,3,5-triisopropyl benzene by eliminating $CO_2$, as the anti-agers, organic and inorganic pigments to color the products, azoisobutyrodinitrile as the expanding agent and salts of organic mercaptans with zinc, cadmium, lead, tin, bismuth or antimony as the accelerators. Crosslinking by the process according to the invention may also be completed in combination with peroxide catalysts.

The products obtained by the process according to the invention are highly elastic synthetic resins of high tensile and impact strength. They also exhibit outstanding resistance to abrasion, oils, petrol and weathering, and may be used, for example, as structural materials in the manufacture of motor cars and machinery in general.

The invention is further illustrated but not limited by the following examples in which parts are by weight unless otherwise specified.

EXAMPLE 1

Preparation of a polyurethane composition as the starting material

About 1000 parts of a polyester urethane (OH number 56) obtained from about 7837 parts of 1,6-hexanediol-adipic acid polyester (OH number 134) and about 878 parts of toluylene diisocyanate, are stirred for about 10 minutes at about 80° C. with about 9 parts of water and about 103.5 parts of toluylene diisocyanate. The highly fluent mixture is poured into waxed metal containers provided with tight-fitting lids. The composition is tempered for about 24 hours at about 80° C., during which it assumes a viscous consistency. At about 80° C., its Defoplasticity is 450, and at 100° C. its Mooney viscosity (large rotor) is 22.

Crosslinking according to the invention

About 100 parts of this storable and rollable polyurethane composition are mixed on cooled rubber mixing rolls with about 20 parts of carbon black and about 11.5 parts of dimeric 2,4'-diisocyanatodiphenylmethane. The dimeric isocyanate was obtained by treating a mixture of 2,4'- and 4,4'-isomers in a ratio of 90:10 with tributyl phosphine. It melts at 191° C. When fresh, the Mooney viscosity at 121° C. is 21. After the mixture has been stored for 2, 7 and 14 days at room temperature, 23, 26 and 31 viscosity units, respectively, are measured. This means that even after 14 days, the mixture can be worked in exactly the same way as at the time of its preparation.

Following vulcanization by the conventional method, a material with the following physical properties is obtained in 10 minutes at 132° C.

Tensile strength (kg./cm.$^2$) _____ 335
Breaking elongation (percent) _____ 505
Shore hardness A _____ 83
Resilience (percent) _____ 40
DIN-abrasion 53516 (mm.$^3$) _____ 39

After the material has been stored in boiling water for 3 days, it is found to exhibit the following properties:

Tensile strength (kg./cm.$^2$) _____ 170
Shore hardness _____ 79
Resilience (percent) _____ 36

Comparison test

By replacing the 11.5 parts by weight of dimeric 2,4'-diphenylmethane diisocyanate used for Example 1, by the equivalent quantity of dimeric toluylene diisocyanate (8.0 parts), a mixture is obtained which behaves in exactly the same way on the mixing rolls.

Immediately after it has been prepared, the mixture has a Mooney viscosity at 121° C. of 22. After the mixture has been stored for 1, 2 and 3 days, respectively, it is found by measurement to exhibit viscosities of 36, 58 and 91. This means that it must be molded by the conventional methods within a period of some 48 hours. On completion of vulcanization in a mold, test specimens exhibiting the following physical properties are obtained in 10 minutes at 132° C.

Tensile strength (kg./cm.$^2$) _____ 330
Breaking elongation (percent) _____ 510
Shore hardness A _____ 82
Resilience (percent) _____ 39
DIN abrasion 53516 (mm.$^3$) _____ 335

After a sample has been treated with boiling water for more than three days, it is found to exhibit the following properties:

Tensile strength (kg./cm.$^2$) _____ 75
Shore hardness A _____ 71
Resilience (percent) _____ 24

EXAMPLE 2

Preparation of a polyurethane composition as starting material

About 122 parts of thiodiglycol are heated for about 4 hours to from about 160 to about 170° C. at normal pressure and then for about 5 hours at about 100 mm. Hg pressure with about 118 parts of 1,6-hexanediol in the presence of about 0.5 part of p-toluene sulphonic acid methyl ester. About 100 parts of the resulting polythioether (OH number 60) are mixed with about 16.0 parts of toluene diisocyanate following the addition of about 4.5 parts of butanediol, and the resulting mixture heated for about 12 hours at about 90° C.

Reaction according to the invention

About 100 parts of the rollable, plastic and rubber-like polyurethane composition are mixed on cooled mixing rolls with about 20 parts of pyrogenic silica and about 11.3 parts of dimeric 2,4-diphenyl-methane diisocyanate. On completion of vulcanization in molds heated to about 150° C. by the method commonly employed in the rubber industry, test specimens exhibiting the following physical properties are obtained after 25 minutes:

Tensile strength (kg./cm.$^2$) _____ 220
Breaking elongation (percent) _____ 380
Shore hardness A _____ 87
Resilience (percent) _____ 58

When fresh, the intermediate mixture has a Mooney viscosity of 32 at 100° C. After a week's storage at room temperature, its Mooney viscosity is 37. In other words, the mixture is still readily workable even after this time.

Comparison test

Mixtures based on polythioethers prepared by using other isocyanates such as, for example, dimeric 2,4-toluylene diisocyanate, cannot be molded after 2 days storage at room temperature because they have already undergone pronounced pre-vulcanization.

EXAMPLE 3

Preparation of a polyurethane composition as starting material

About 100 parts of a polyester (OH number 51) prepared by thermal esterification of diethylene glycol and adipic acid, are mixed with about 4.5 parts of 1,4-butanediol and the resulting mixture reacted at about 80° C. with about 18.7 parts of 4,4-diphenylmethane diisocyanate. The mixture is tempered for about 24 hours at about 90° C. and solidifies into a block of plastic, rollable material which has a Mooney viscosity $ML_4$ of 21 at 100° C.

Reaction according to the invention

About 100 parts of the resulting polyurethane composition are mixed on cooled mixing rolls with about 0.5 part of stearic acid, about 25 parts of carbon black and about 10.6 parts of urea diisocyanate prepared from 2,4-diphenylmethane diisocyanate (M.P. 192–198° C.; 17.5% NCO). Directly after its preparation, the mixture has a Mooney viscosity $ML_4$ of 28 at 100° C. After 7 days storage, its Mooney viscosity at 100° C. is 30 and, after 14 days storage, 33. After it has been molded in the usual way at 132° C. over a period of about 45 minutes, test specimens exhibiting the following properties are obtained.

Tensile strength (kg./cm.$^2$) _____ 220
Breaking elongation (percent) _____ 605
Shore hardness A _____ 71
Resilience (percent) _____ 41
Structural strength on Pohle's ring (kg./4 mm.) ___ 19
DIN-abrasion _____ 42

If, following 14 days storage, a sample of this mixture is processed in the same way at room temperature, test specimens exhibit practically identical physical data.

Comparison test

If, in the above mixture, the 10.6 parts of the diisocyanate to be used in accordance with the invention are replaced by about 7.1 parts of the urea diisocyanate prepared from 2,4-toluylene diisocyanate, i.e. by an equivalent quantity of this compound, a mixture of initially the same appearance is obtained. Immediately after its preparation, the mixture has a Mooney viscosity of 31. After 3 days, its Mooney viscosity is 54 and, after 7 days, over 200.

If the mixture is molded over a period of about 45 minutes at about 132° C. one day after its preparation, test specimens exhibiting the following physical data, are obtained:

Tensile strength (kg./cm.$^2$) _____ 210
Breaking elongation (percent) _____ 595
Shore hardness A _____ 70
Resilience (percent) _____ 42
Structural strength on Pohle's ring (kg./4 mm.) ___ 18
DIN-abrasion _____ 51

If an attempt is made to mold another part of the mixture 7 days after its preparation, the resulting test specimens are by no means homogeneous because, even after this relatively short time, the composition has undergone such marked prevulcanization that it is not able to flow in the mold.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. Elastomeric polyurethane plastics prepared by the process which comprises reacting a storage stable intermediate with an excess of an organic diisocyanate having the formula

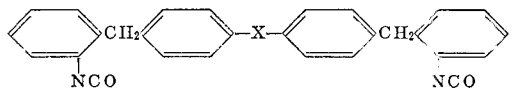

wherein X is

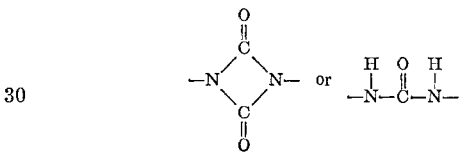

said storage stable intermediate being prepared by reacting an organic compound having a molecular weight of at least 800 and having active hydrogen atoms which are reactive with NCO groups and a chain extending agent having active hydrogen atoms which are reactive with NCO groups and having a molecular weight less than 800, with an organic diisocyanate, said reactants being present in ratios such that the storage stable intermediate has terminal active hydrogen atoms.

2. The polyurethane plastic of claim 1 wherein the storage stable intermediate is reacted with a mixture of the diisocyanate of the formula set forth and another organic diisocyanate.

3. The polyurethane plastic of claim 1 wherein the diisocyanate has the formula

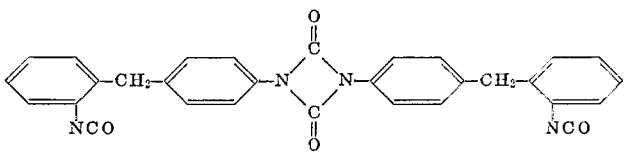

4. The polyurethane plastic of claim 1 wherein the diisocyanate has the formula

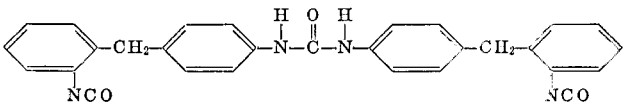

References Cited

UNITED STATES PATENTS 2,818,404  12/1957  Hill _____ 260—75
3,206,352   9/1965  Gollis et al. _____ 161—93

DONALD E. CZAJA, Primary Examiner

M. J. WELSH, Assistant Examiner

U.S. Cl. X.R.

260—2.5, 37, 40, 47, 77.5, 453